(12) United States Patent
Smith et al.

(10) Patent No.: US 8,074,209 B2
(45) Date of Patent: Dec. 6, 2011

(54) EXTENDING NATIVE DATA TYPES

(75) Inventors: Scott David Smith, Kirkland, WA (US); Rahul Sudhir Kumar, Kirkland, WA (US); Todd Haugen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1186 days.

(21) Appl. No.: 11/619,948

(22) Filed: Jan. 4, 2007

(65) Prior Publication Data
US 2008/0168079 A1   Jul. 10, 2008

(51) Int. Cl.
*G06F 9/45* (2006.01)
(52) U.S. Cl. ........ 717/136; 717/104; 717/105; 717/110; 717/164; 717/170
(58) Field of Classification Search .................. 717/136
See application file for complete search history.

(56) References Cited

U.S. PATENT DOCUMENTS

| | | | |
|---|---|---|---|
| 6,243,698 B1 | 6/2001 | Powers | |
| 6,502,099 B1 | 12/2002 | Rampy | |
| 6,789,252 B1 * | 9/2004 | Burke et al. | 717/100 |
| 7,007,266 B1 | 2/2006 | Isaacson | |
| 7,051,273 B1 | 5/2006 | Holt | |
| 7,058,933 B2 * | 6/2006 | Fomenko et al. | 717/145 |
| 7,058,940 B2 | 6/2006 | Calahan | |
| 7,089,502 B2 | 8/2006 | Nakajima | |
| 2005/0044103 A1 | 2/2005 | MacLeod | |
| 2005/0050073 A1 * | 3/2005 | Demiroski et al. | 707/100 |
| 2005/0114851 A1 * | 5/2005 | Watson-Luke et al. | 717/168 |
| 2008/0016492 A1 * | 1/2008 | Kristoffersen et al. | 717/104 |

OTHER PUBLICATIONS

Automating and Extending MS Outlook, Jun. 14, 2001, http://www.microsoft.com/technet/prodtechnol/exchange/55/maintain/automate.mspx.
The Design and Implementation of a Language for Extending Applications, 1994, http://www.lua.org/semish94.html.
Talevski, Alex, et al., Meta Model Driven Framework for the Integration and Extension of Application Components, 2004. http://ieeexplore.ieee.org/xpl/freeabs_all.jsp?tp=&amumber=1410971&isnumber=30574.

* cited by examiner

*Primary Examiner* — Thomas K Pham
(74) *Attorney, Agent, or Firm* — Shook Hardy & Bacon LLP (57) ABSTRACT

The functionality of a core application is extended using an add-on application (module) by extending native data types on the core application with custom data types and custom actions on the module. The module provides metadata associated with its custom data types and custom actions to the core application, which creates a dynamic type/action table. In some cases, native data types may be extended with custom data types and their associated actions. In other cases, native data types may be extended with custom actions from the module. The custom actions may be enabled for instances of native data types that have been extended. When a custom action is selected, code corresponding with the selected custom action is called from the module and run to perform the selected custom action.

20 Claims, 7 Drawing Sheets

EXTENDING NATIVE DATA TYPES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Software applications often provide a set of tools and supporting data types that provide a core level of functionality to users. However, it is often desirable to add additional tools and to extend the functionality of a core software application. For example, a software provider may wish to provide further functionality for a software application after it has been released. Additionally, third-party software providers may wish to provide products that add functionality to another software provider's application.

Typically, add-on applications (i.e., modules) may be provided to extend the functionality of a core software application. However, current approaches to software design often dictate that the modules be written in the schema of the core applications that they extend. Data used by the module must be supported by the core application. This presents a number of drawbacks. For instance, a module cannot maintain its own types of data separate from the core application. Additionally, a module typically must be written specifically for a particular core application to operate with that application. As a result, an existing module may not be easily adapted to operate with an application that it was not originally intended to extend.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments are directed to extending the functionality of a core application with a module by extending native data types of the core application with custom data types and custom actions from the module. Native data types may be extended in at least two ways. First, a native data type may be extended with a custom data type and its associated actions to allow for the creation of custom objects. Second, a native data type may be extended with a custom action intended to extend the functionality of the native data type.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to extending the functionality of a core application with a module. The module may include its own custom data types that have associated custom actions, allowing for the creation of custom objects. Additionally, the module may include custom actions that extend the actions associated with native data types of the core application. The functionality of the core application may be extended in embodiments by extending native data types of the core application with custom data types and custom actions from the module. Native data types may be extended in at least two ways in accordance with embodiments of the present invention. In one embodiment, a native data type may be extended with a custom data type and its associated actions to allow for the creation of custom objects. In another embodiment, a native data type may be extended with a custom action intended to extend the functionality of the native data type.

Accordingly, in one aspect, an embodiment of the present invention is directed to computer-readable media having computer-useable instructions embodied thereon for performing a method for extending a native data type from a core application with a custom data type and one or more custom actions from a module. The method includes obtaining metadata from the module. The metadata includes the custom data type, the custom actions, and one or more pointers to code in the module corresponding with the custom actions. The method also includes generating a dynamic table using the metadata. The dynamic table includes entries corresponding with the custom actions. The method further includes creating an instance of the native data type and tagging the instance of the native data type with an identifier for the custom data type. The method still further includes enabling the custom actions for the instance of the native data type.

In another embodiment of the invention, an aspect is directed to computer-readable media having computer-useable instructions embodied thereon for performing a method of extending a native data type from a core application with one or more custom actions from a module. The method includes obtaining metadata from the module. The metadata includes the custom actions for the native data type and one or more pointers to code in the module corresponding with the custom actions. The method also includes generating a dynamic table using the metadata. The dynamic table includes entries corresponding with the custom actions. The method further includes enabling the custom actions for instances of the native data type in the core application.

A further embodiment of the invention is directed to computer-readable media embodying a data structure for extending native data types from a core application using custom actions from a module. The data structure includes a first data field containing data representing a native data type from the core application or a custom data type from the module; a second data field containing data representing a custom action associated with the native data type or the custom data type; and a third data field containing data representing a pointer to code in the module for performing the custom action.

Figure 1:
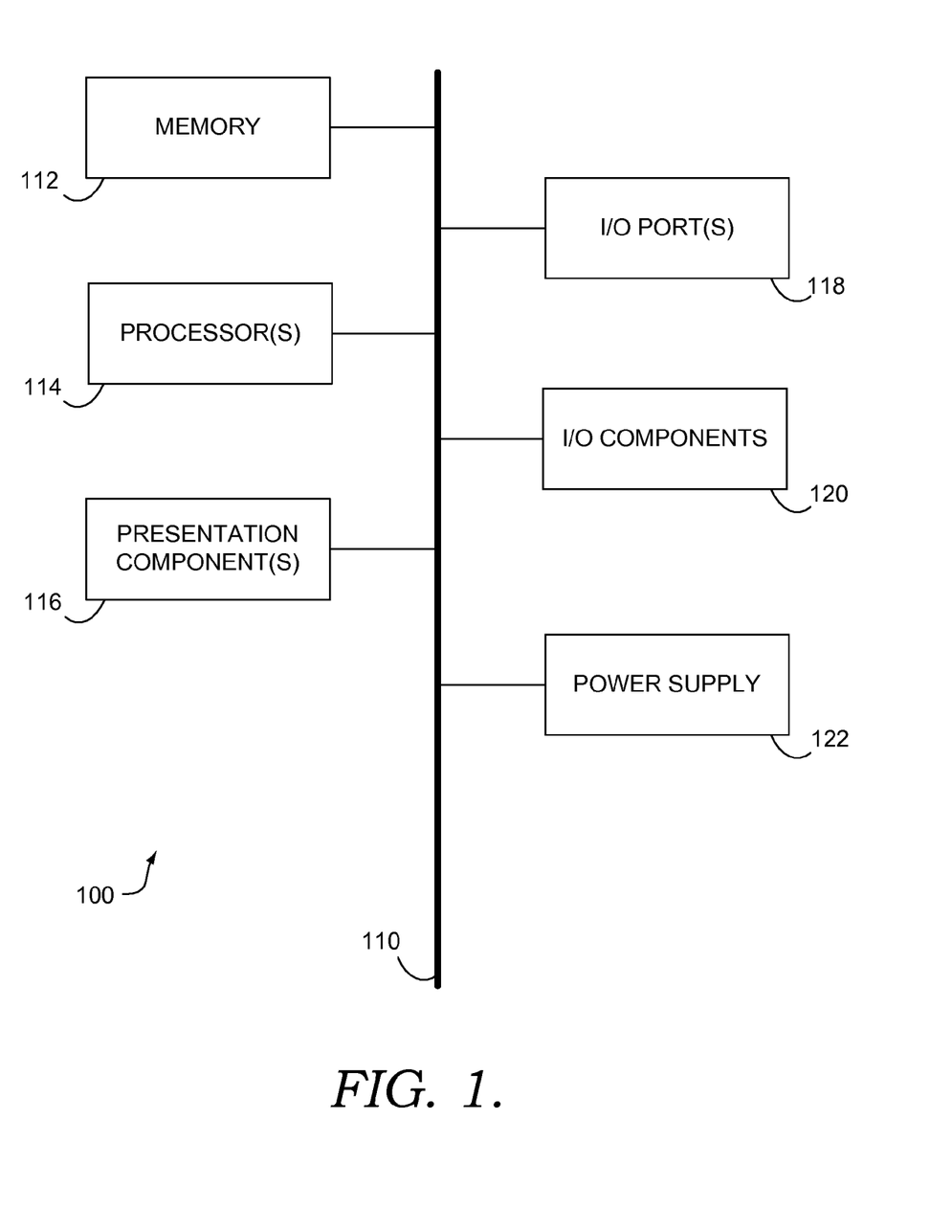
FIG. 1 is a block diagram of an exemplary computing environment suitable for use in implementing the present invention.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As indicated previously, embodiments of the present invention are directed to using modules to extend the functionality of core applications by extending native data types of the core applications. Generally, a core application includes one or more native data types, which may each have a variety of native actions. As a specific example, a core software application that enables users to manage their time and tasks may have native data types such as "contact," "activity," "appointment," and "task." Each of these native data types may have associated native actions provided by the core application. For instance, an action associated with a "contact" data type may include "Send email to contact." These actions are typically made available to users via user interface elements, such as menu items or specific gestures (e.g., a "double-click" event). When a user selects an action associated with an instance of a native data type, the core application runs code to perform the selected action.

Modules in accordance with embodiments of the present invention include custom data types and custom actions that may extend native data types of core applications. Native data types may be extended in at least two ways using custom data types and custom actions from modules. First, native data types may be extended with custom data types having associated custom actions. In other words, a module may add its own custom data types with associated custom actions to a core application. In such cases, the module owns the set of custom actions enabled on each of its custom data types. As a continuation of the example of a core application enabling users to manage time and tasks, a bill pay module may be provided that extends the functionality of the core application by allowing users to pay bills and perform other bill-related actions. The bill pay module may include a custom data type such as "bill" that has associated custom actions such as "Pay bill." If a bill item is added to a list in the core application, menu items and other actions associated with the bill item would be provided by the bill pay module.

A second way that a module may extend native data types is by providing custom actions for the native data types. In other words, a module may add custom actions to native data types to extend the functionality of the native data types. Continuing the bill pay module example, a custom action added for a "contact" native data type may be "Convert contact to payee." Accordingly, the custom action would be enabled for each contact item. For instance, if a user were to access a menu associated with a contact item, the menu would include the native actions provided by the core application as well as the custom actions provided by the bill pay module.

Embodiments of the present invention provide a simple approach that allows, among other things, the ability to separate data between a core application and a module while still providing deep integration between the core application and the module. Accordingly, although there is data separation between the core application and module, data for each may be integrated and used for a single object.

In accordance with embodiments of the present invention, a boundary is clearly defined between the module's data and the core application's data. The module is responsible for storing its data in its own datastore and for synchronization of data between the core application and the module. The core application then includes properties (as will be described in further detail below) to allow the module's data to interact with the core application's features. As a result, a module may maintain its own data structure while still being able to communicate with and extend the functionality of the core application.

In an embodiment, when a module is added to a core application, the module provides metadata to the core application. The metadata includes data corresponding to custom data types and custom actions provided by the module. Using the metadata from the module, the core application creates a dynamic table, referred to herein as a type/action table, that details the custom data types and custom actions that will extend native data types on the core application. The core application uses the type/action table to enable custom actions from the module. When a custom action is selected, a pointer in the type/action table associated with the selected custom action is used to call code in the module to perform the custom action. The module runs the code to perform the custom action and stores data as necessary to the core application's datastore and/or the module's datastore.

Figure 2:
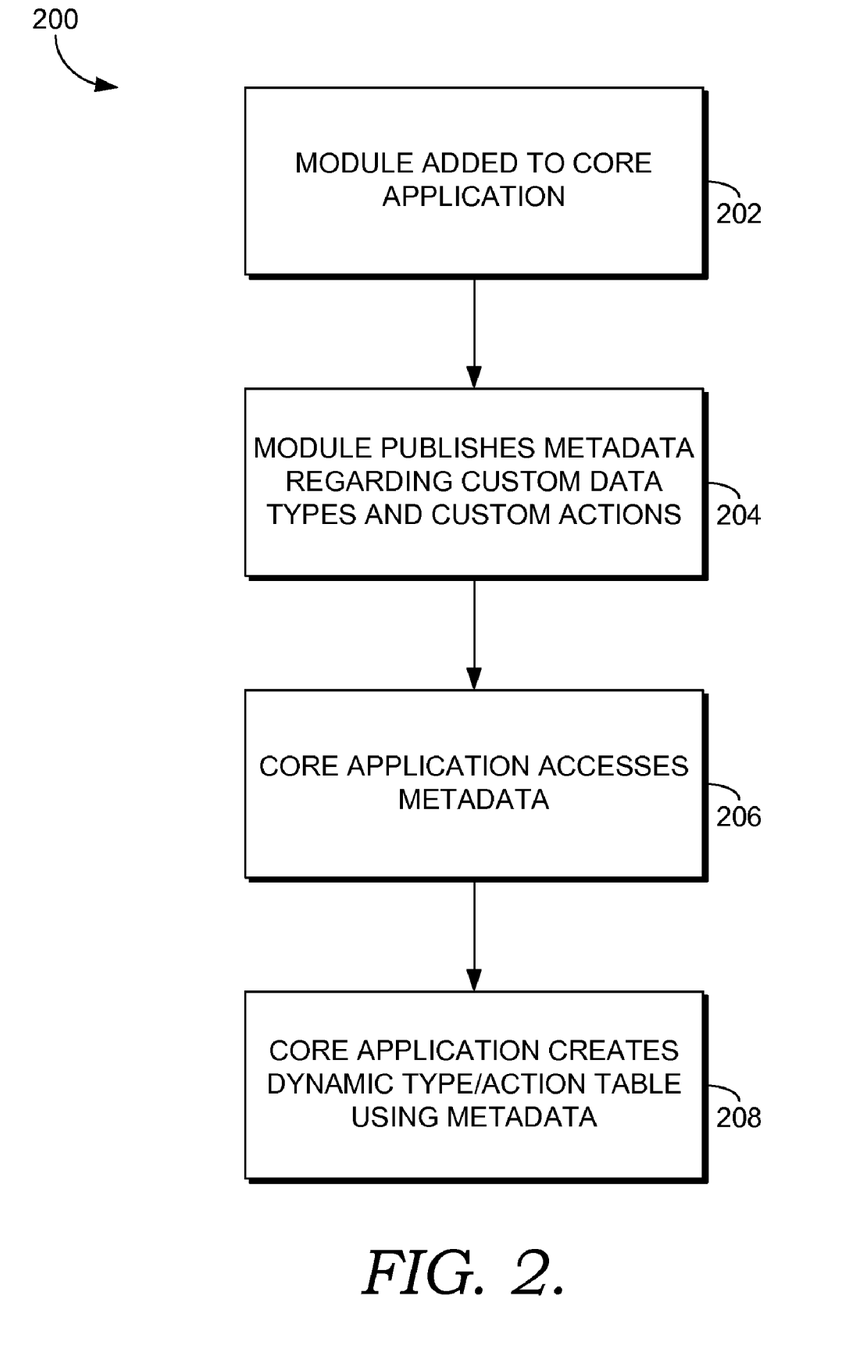
FIG. 2 is a flow diagram showing an exemplary method for creating a type/action table in accordance with an embodiment of the present invention.

Turning to FIG. 2, a flow diagram is illustrated which shows an exemplary method 200 for creating a type/action table in accordance with an embodiment of the present invention. Initially, as shown at block 202, a module is added to a core application. As shown at block 204, the module publishes metadata regarding its custom data types and custom actions. As indicated previously, the custom actions may include actions that are associated with custom data types provided by the module and actions that are associated with native data types provided by the core application. The metadata further includes pointers to code in the module for performing the custom actions. The core application accesses the metadata published by the module, as shown at block 206. Using the metadata, the core application dynamically creates a type/action table, as shown at block 208.

Figure 3:
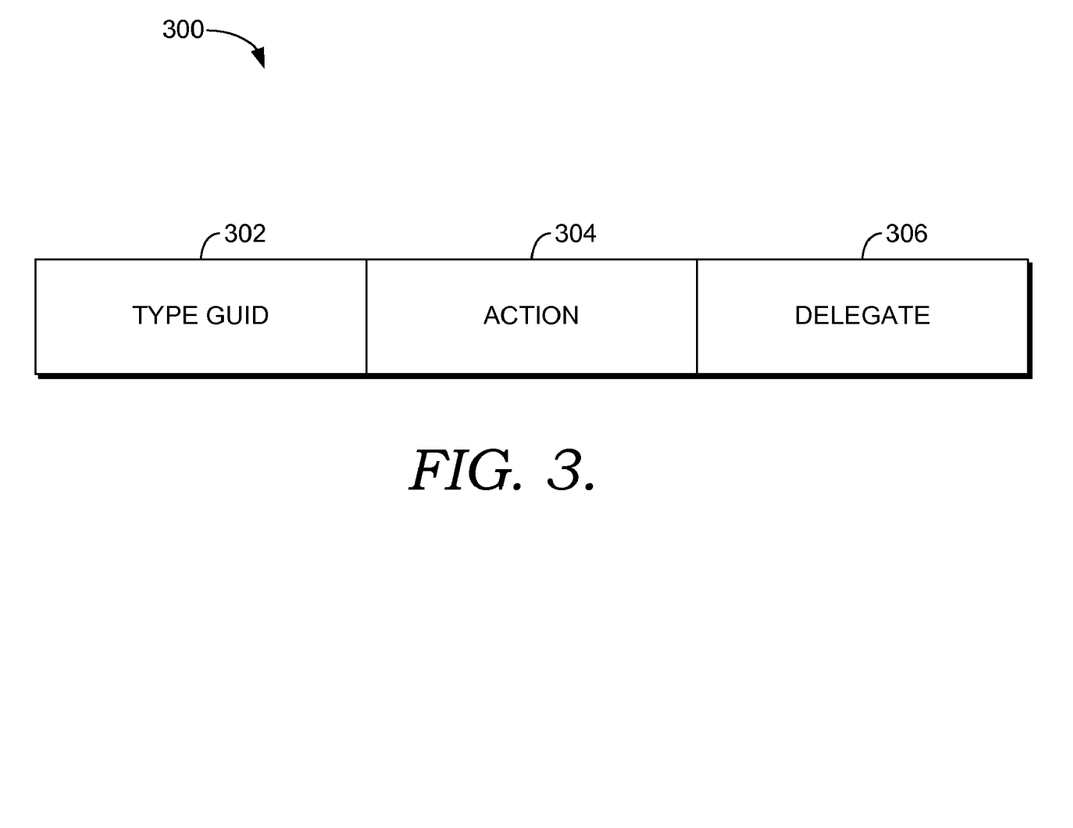
FIG. 3 is an exemplary data structure for a type/action table in accordance with an embodiment of the present invention.

An exemplary data structure 300 for a type/action table in accordance with an embodiment of the present invention is illustrated in FIG. 3. The data structure 300 includes a first data field 302 containing data representing a data type. Typically, this will comprise a globally unique identifier (GUID) for the data type. The data type GUID defines either a native data type or a custom data type. In the case that a custom action is being provided for a custom data type, the GUID for that custom data type is provided in the first data field 302. In the case that a custom action is being provided for a native data type, the GUID used by the core application for that native data type is provided in the first data field 302.

The data structure 300 also includes a second data field 304 containing data representing a custom action available for the associated data type in the first data field 302. The first data field 302 and the second data field 304 together uniquely identify a custom action that can be taken for a specific data type.

The data structure further includes a third data field 306 containing data representing a delegate. The delegate is a pointer to the method to be invoked for the custom action in the second data field 304. In particular, this is a pointer to code that the module provides to perform the custom action.

Figure 4:
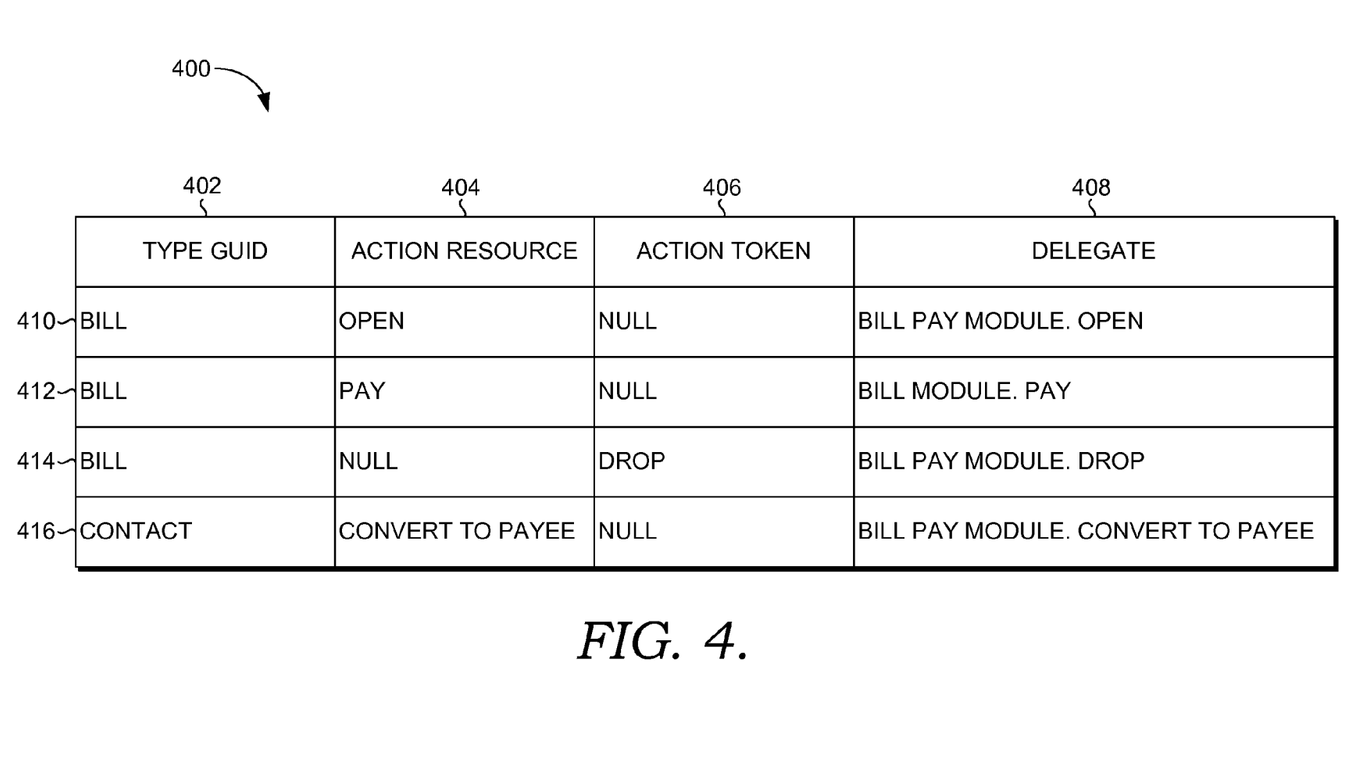
FIG. 4 is a type/action table created using metadata from a hypothetical bill pay module in accordance with an embodiment of the present invention.

As a specific example, suppose, for instance, that a bill pay module is used to extend the functionality of a core application that enables users to manage their time and tasks. When the bill pay module is added to the core application, the bill pay module publishes metadata corresponding with its custom data types and custom actions. The core application uses the metadata from the bill pay module to create the type/action table 400 shown in FIG. 4. As shown in FIG. 4, the type/action table 400 includes a type GUID data field 402, an action resource data field 404, an action token data field 406, and a delegate data field 408. The type GUID data field 402 includes a GUID associated with either a native data type from the core application or a custom data type from the module. The action resource data field 404 and the action token data field 406 are used to indicate a custom action for a data type. Each of these action data fields may be associated with a different user interface element. For instance, the action resource data field 404 may include an action to be enabled via menu items, while the action token resource data field 406 may include an action to be enabled via a specific gesture (e.g., a double-click event). The delegate data field 408 contains a pointer to code in the bill pay module to perform a specified action. Accordingly, each row in the type/action table 400 identifies a custom action that may be taken for a specific data type and the location of code in the module to perform the custom action.

In the present example, the bill pay module has provided metadata associated with a custom data type, "Bill." Additionally, the bill pay module has defined three custom actions for the "Bill" custom data type. Accordingly, entries 410, 412, and 414 each include the GUID for the "Bill" custom data type. Entries 410 and 412 are menu actions, while entry 414 is a gesture action. When a bill item is created, the actions associated with entries 410, 412, and 414 will be enabled for the bill item. The module has also provided metadata associated with a custom action for a "Contact" native data type. In particular, entry 416 has been created in the type/action table 400 to provide a "Convert to payee" custom action for the "Contact" native type. Based on the entry 416, "Convert to payee" would be provided as a menu item for all contacts in the core application.

In some embodiments of the present invention, a type/action table may be created using metadata from multiple modules. For instance, the type/action table 400 of FIG. 4 may have been created after two separate bill pay modules were added to the core application. Entries 410, 412, and 416 may have been created using metadata from a first bill pay module, while entry 414 may have been created using metadata from a second bill pay module. The delegate for each of entries 410, 412, and 416 would include a pointer to code in the first bill pay module, while the delegate for entry 414 would include a pointer to code in the second bill pay module.

After a module has been added to a core application and a type/action table has been dynamically created, instances of native data types on the core application may be extended by custom data types and custom actions from the module. As indicated previously, an instance of a native data type on a core application may be extended in at least two ways. First, an instance of a native data type may be extended with a custom data type and a custom action from the module. This allows for the creation of custom objects on the core application that have their own corresponding actions. Second, an instance of a native data type may be extended with a custom action from the module. This allows for the functionality of the native data type to be extended by providing additional actions for the native data type.

Figure 5:
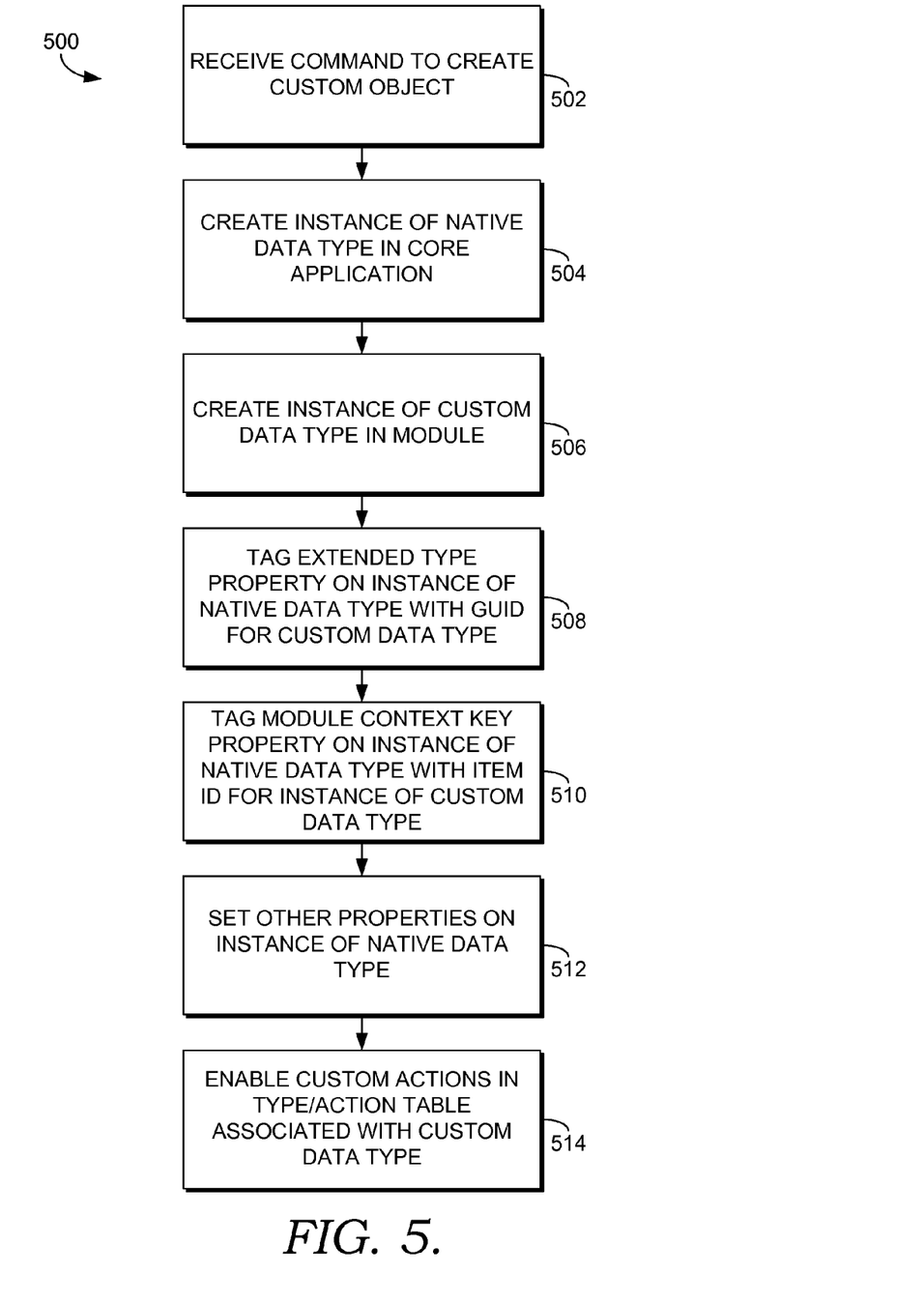
FIG. 5 is a flow diagram showing an exemplary method for creating a custom object by extending a native data type with a custom data type and its associated actions in accordance with an embodiment of the present invention.

Referring now to FIG. 5, a flow diagram is provided illustrating an exemplary method 500 for creating a custom object on a core application by extending an instance of a native data type with a custom data type and its associated actions in accordance with an embodiment of the present invention. Initially, a command to create a custom object is received, as shown at block 502. In response to the command, an instance of a native data type is created in the core application, as shown at block 504. Additionally, an instance of a custom data type is created in the module, as shown at block 506.

To facilitate the extension of the native data type, the instance of the native data type on the core application includes extended properties. The extended properties include an extended type property and a module context key property. As shown at block 508, the extended type property is tagged with a GUID that identifies the custom data type from the module that extends the instance of the native data type. By using the custom data type GUID from the extended type property and referring to the type/action table, the core application may determine what custom actions are associated with the instance of the native data type. Additionally, as shown at block 510, the module context key property is tagged with an item ID for the instance of the custom data type that was created in the module at block 506. This allows the core application and module to identify data in the module associated with the instance of the custom data type that matches the instance of the native data type.

By creating an instance of a native data type on the core application and a corresponding instance of a custom data on the module, embodiments of the present invention allow data separation between the core application and the module. The module may maintain its own data and may synchronize data between the application and the module. Accordingly, the instance of the native data type and the instance of the custom data type together act as a single custom object.

In some cases, as shown at block 512, the module may set other properties on the instance of the native data type. For example, the module may set properties such as a title or a due date. Finally, as shown at block 514, the custom actions associated with the custom data type are enabled via the type/action table. In particular, the core application uses the custom type GUID in the extended type property field of the instance of the native data type and refers to the type/action table to determine the associated actions.

Figure 6:
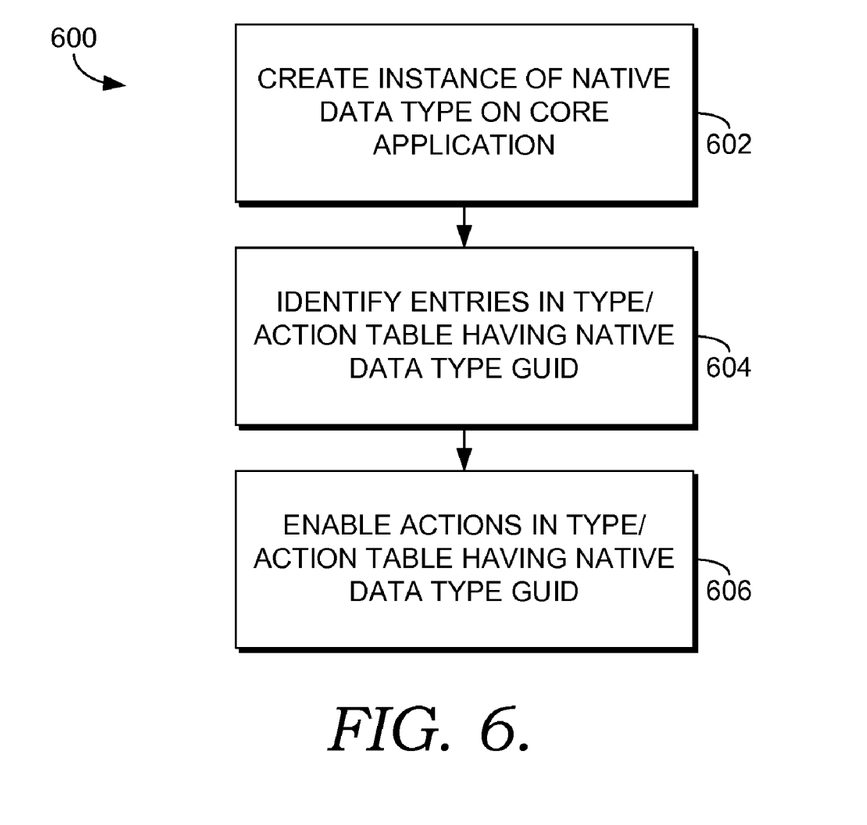
FIG. 6 is a flow diagram showing an exemplary method for extending a native data type with custom actions in accordance with an embodiment of the present invention.

Turning now to FIG. 6, a flow diagram is provided showing an exemplary method 600 for extending an instance of a native data type with a custom action from a module in accordance with an embodiment of the present invention. Initially, as shown at block 602, an instance of a native data type is created on the core application. The instance of the native data type may have been created either before or after the addition of the module and creation of a type/action table. The core application identifies any entries in the type/action table having the native data type GUID, as shown at block 604. Actions in the type/action table identified as having the native data type GUID are then enabled for the instance of the native data type, as shown at block 606.

Figure 7:
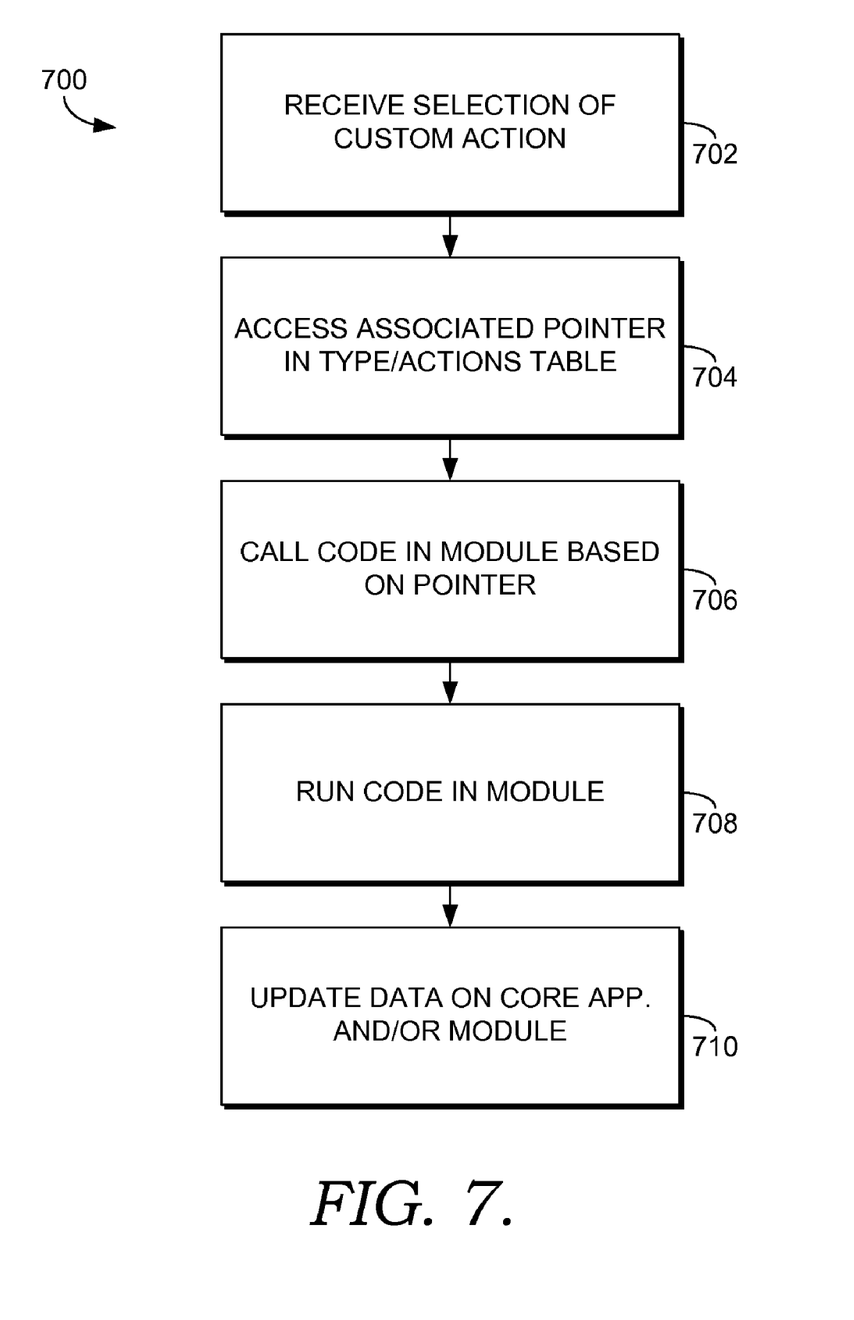
FIG. 7 is a flow diagram showing an exemplary method for performing a custom action using code in a module in accordance with an embodiment of the present invention.

Referring now to FIG. 7, a flow diagram is illustrated showing an exemplary method 700 for performing a custom action from a module in accordance with an embodiment of the present invention. Initially, as shown at block 702, a selection of a custom action is received. The custom action may be a custom action associated with either a custom data type or a native data type. Based on the selection, the pointer from the delegate data field in the type/action table associated with the selected action is accessed, as shown at block 704. Using the pointer from the type/action table, code in the module is called, as shown at block 706. The code is run in the module to perform the selected action, as shown at block 708. Additionally, the module updates data on the core application's datastore and/or the module's datastore, as shown at block 710.

Continuing the bill pay module example discussed above with reference to the type/action table 400 shown in FIG. 4, a user may wish to add a bill item. In the present example, the bill pay module includes code to create a bill object by extending an instance of an "Activity" native data type in the core application. When a user selects to create a bill object, an instance of an "Activity" native data type is created with extended properties on the core application. Additionally, the bill pay module creates an instance of a "Bill" custom data type on the bill pay module. The extended type property for the instance of the "Activity" native data type is tagged with the GUID for the "Bill" custom data type. Additionally, the module context key property for the instance of the "Activity" native data type is tagged with the ID for the instance of the "Bill" custom data type created on the module. Other properties of the instance of the "Activity" native data type, such as a title "Power Bill" and a due date of "Dec. 1, 2006," are also set by the module.

Upon creation of the bill item, the core application enables the custom actions for the bill item by referring to custom actions indicated for the "Bill" custom data type in the type/action table 400. For instance, if the user accesses a menu associated with the bill item, the menu would include an "Open" menu item and a "Pay" menu item. If the user selects the "Pay" menu item, the delegate in the entry 412 is called, and code associated with that delegate is run in the bill pay module.

Additionally, in the present example, the bill pay module has extended the functionality of the "Contact" native data type. In particular, the bill pay module has added a custom action that allows a user to convert a contact to a payee. For instance, if the user accesses a menu associated with a contact item, the core application provides a menu that includes all items corresponding to native actions provided by the core application, as well as the custom action "Convert to payee" provided in the entry 416 in the type/action table 400. If the user selects the menu item corresponding with the "Convert to payee" custom action, the delegate in the entry 416 is called, and code associated with that delegate is run in the bill pay module.

As can be understood, embodiments of the present invention are directed to extending the functionality of core applications using modules by extending native data types of the core applications with custom data types and custom actions from the modules. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media having computer-useable instructions embodied thereon for performing a method for extending a native data type from a core application with a custom data type and one or more custom actions from a module, the method comprising:
    obtaining metadata from the module, the metadata including the custom data type, the one or more custom actions, and one or more pointers to code in the module corresponding with the one or more custom actions;
    generating a dynamic table using the metadata, the dynamic table including one or more entries corresponding with the one or more custom actions;
    creating an instance of the native data type;
    tagging the instance of the native data type with an identifier for the custom data type;
    enabling the one or more custom actions for the instance of the native data type;
    receiving a selection of one of the one or more custom actions;
    accessing a pointer in the dynamic table, the pointer corresponding with the selected custom action;
    calling code in the module corresponding with the pointer; and
    running the code in the module to perform the selected custom action.

2. The one or more computer-storage media of claim 1, wherein each of the one or more entries in the dynamic table comprises:
    a first data field containing data representing the custom data type;
    a second data field containing data representing one of the one or more custom actions; and
    a third data field containing data representing a pointer to code in the module for performing the custom action represented in the second data field.

3. The one or more computer-storage media of claim 1, wherein the method further comprises creating an instance of the custom data type on the module.

4. The one or more computer-storage media of claim 3, wherein the method further comprises tagging the instance of the native data type with an identifier corresponding with the instance of the custom data type on the module.

5. The one or more computer-storage media of claim 1, wherein the method further comprises setting one or more properties of the instance of the native data type.

6. The one or more computer-storage media of claim 1, wherein enabling the one or more custom actions for the instance of the native data type comprises providing a user interface element for each of the one or more custom actions allowing for the selection of each of the one or more custom actions.

7. The one or more computer-storage media of claim 1, wherein the method further comprises updating data on at least one of the core application and the module.

8. The one or more computer-storage media of claim 7, wherein updating data on at least one of the core application and the module comprises synchronizing data between the instance of the native data type on the core application and an instance of a custom data type on the module.

9. One or more computer-storage media having computer-useable instructions embodied thereon for performing a method of extending a native data type from a core application with one or more custom actions from a module, the method comprising:
    obtaining metadata from the module, the metadata including the one or more custom actions for the native data type and one or more pointers to code in the module corresponding with the one or more custom actions;
    generating a dynamic table using the metadata, the dynamic table including one or more entries corresponding with the one or more custom actions;
    enabling the one or more custom actions for instances of the native data type in the core application;
    receiving a selection of one of the one or more custom actions;
    accessing a pointer in the dynamic table, the pointer corresponding with the selected custom action;
    calling code in the module corresponding with the pointer; and
    running the code in the module to perform the selected custom action.

10. The one or more computer-storage media of claim 9, wherein each of the one or more entries in the dynamic table comprises:
    a first data field containing data representing the native data type;
    a second data field containing data representing one of the one or more custom actions; and
    a third data field containing data representing a pointer to code in the module for performing the custom action represented in the second data field.

11. The one or more computer-storage media of claim 9, wherein enabling the one or more custom actions for instances of the native data type in the core application comprises identifying entries in the dynamic table having an identifier for the native data type.

12. The one or more computer-storage media of claim 11, wherein enabling the one or more custom actions for instances of the native data type in the core application further comprises correlating the entries in the dynamic table having the identifier for the native data type with the one or more instances of the native data type.

13. The one or more computer-storage media of claim 9, wherein enabling the one or more custom actions for instances of the native data type comprises providing a user interface element for each of the one or more custom actions allowing for the selection of each of the one or more custom actions.

14. The one or more computer-storage media of claim 9, wherein the method further comprises updating data on at least one of the core application and the module.

15. A method implemented by one or more computing devices for extending a native data type from a core application running on the one or more computing devices with a custom data type and one or more custom actions from a module, the method comprising:
    obtaining metadata from the module, the metadata including the custom data type, the one or more custom actions, and one or more pointers to code in the module corresponding with the one or more custom actions;

generating a dynamic table using the metadata, the dynamic table including one or more entries corresponding with the one or more custom actions;

creating an instance of the native data type;

tagging the instance of the native data type with an identifier for the custom data type;

enabling the one or more custom actions for the instance of the native data type;

receiving a selection of one of the one or more custom actions;

accessing a pointer in the dynamic table, the pointer corresponding with the selected custom action;

calling code in the module corresponding with the pointer; and running the code in the module to perform the selected custom action.

16. The method of claim 15, wherein the method further comprises creating an instance of the custom data type on the module.

17. The method of claim 16, wherein the method further comprises tagging the instance of the native data type with an identifier corresponding with the instance of the custom data type on the module.

18. The method of claim 15, wherein the method further comprises setting one or more properties of the instance of the native data type.

19. The method of claim 15, wherein the method further comprises updating data on at least one of the core application and the module.

20. The method of claim 19, wherein updating data on at least one of the core application and the module comprises synchronizing data between the instance of the native data type on the core application and an instance of a custom data type on the module.

* * * * *